(12) United States Patent
Pabbichetty

(10) Patent No.: US 9,619,697 B2
(45) Date of Patent: Apr. 11, 2017

(54) IDENTITY AUTHENTICATION PLATFORM

(71) Applicant: HotCoal Inc., San Jose, CA (US)

(72) Inventor: Ramesh Pabbichetty, San Jose, CA (US)

(73) Assignee: HOTCOAL INC., San Jose, CA (US)

( * ) Notice: Subject to any disclaimer, the term of this patent is extended or adjusted under 35 U.S.C. 154(b) by 0 days.

(21) Appl. No.: 14/740,919

(22) Filed: Jun. 16, 2015

(65) Prior Publication Data

US 2016/0371540 A1    Dec. 22, 2016

(51) Int. Cl.
*G06K 9/00* (2006.01)
*G06F 21/32* (2013.01)

(52) U.S. Cl.
CPC ......... *G06K 9/00288* (2013.01); *G06F 21/32* (2013.01); *G06K 9/00255* (2013.01); *G06K 9/00261* (2013.01); *G06K 9/00926* (2013.01)

(58) Field of Classification Search
CPC .. G06Q 20/1085; G06Q 20/042; G07F 19/20; G07F 19/201; G07F 19/202; G07F 19/203; G07F 19/207

USPC .......................................... 382/118
See application file for complete search history.

(56) References Cited

U.S. PATENT DOCUMENTS

| | | |
|---|---|---|
| 9,202,105 B1 | 12/2015 | Wang et al. |
| 2014/0081858 A1* | 3/2014 | Block .................. G07F 19/207 705/43 |

* cited by examiner

*Primary Examiner* — Manuchehr Rahmjoo

(57) ABSTRACT

A system and method for identity authentication, including: registering an identity card issued by an authoritative entity to an individual with an identity authentication platform including generating a reference face recognition template for the individual in response to the identity card presented by the individual during registration; obtaining a real-time photograph of the individual in response to an assertion of an identity made by the individual; and authenticating the assertion made by the individual by generating a target face recognition template in response to the real-time photograph and matching the target face recognition template to the reference face recognition template.

14 Claims, 8 Drawing Sheets

IDENTITY AUTHENTICATION PLATFORM

BACKGROUND

An individual can make an assertion of an identity in a variety of contexts. For example, an individual can make an assertion that they are John Smith when they create an account with a web service or when they log on to an existing account with the web service. In another example, an individual can make an assertion that they are John Smith when they present a credit card number or other identifying information associated with John Smith during an e-commerce transaction.

An assertion of an identity made by an individual can be taken for granted by a web service. For example, a social networking website can accept an assertion by an individual that they are John Smith without requiring any proof from the individual that they are in fact John Smith. An e-commerce website may accept an assertion by an individual that they are John Smith based on the fact that the individual knows John Smith's password to the e-commerce website or knows John Smith's credit card number.

SUMMARY

In general, in one aspect, the invention relates to an identity authentication platform. The identity authentication platform can include: a registration module that enables an individual to register an identity card issued by an authoritative entity to the individual with the identity authentication platform such that the registration module generates a reference face recognition template for the individual in response to the identity card presented by the individual during registration; a sampling module that obtains a real-time photograph of the individual in response to an assertion of an identity made by the individual; and a verifier module that authenticates the assertion made by the individual by generating a target face recognition template in response to the real-time photograph and matching the target face recognition template to the reference face recognition template.

In general, in another aspect, the invention relates to a method for identity authentication. The method can include: registering an identity card issued by an authoritative entity to an individual with an identity authentication platform including generating a reference face recognition template for the individual in response to the identity card presented by the individual during registration; obtaining a real-time photograph of the individual in response to an assertion of an identity made by the individual; and authenticating the assertion made by the individual by generating a target face recognition template in response to the real-time photograph and matching the target face recognition template to the reference face recognition template.

Other aspects of the invention will be apparent from the following description and the appended claims.

BRIEF DESCRIPTION OF THE DRAWINGS

Embodiments of the present invention are illustrated by way of example, and not by way of limitation, in the figures of the accompanying drawings and in which like reference numerals refer to similar elements.

DETAILED DESCRIPTION

Figure 1:
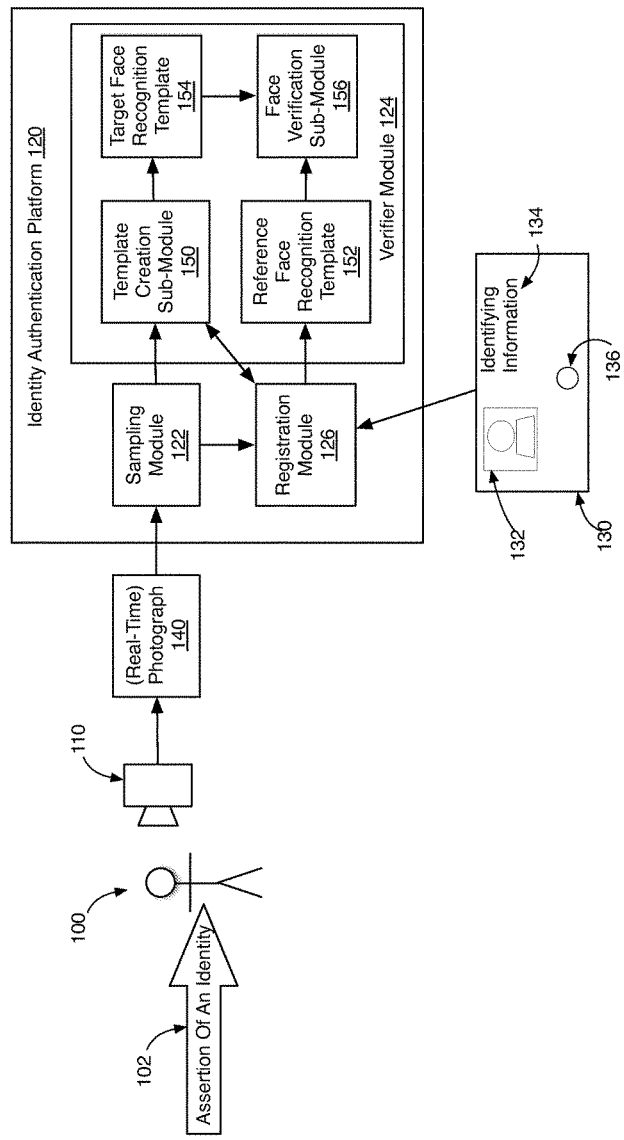
FIG. 1 illustrates an identity authentication platform in one or more embodiments.

Reference will now be made in detail to the various embodiments of the present disclosure, examples of which are illustrated in the accompanying drawings. Like elements in the various figures are denoted by like reference numerals for consistency. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, have not been described in detail so as not to unnecessarily obscure aspects of the present disclosure.

FIG. 1 illustrates an identity authentication platform 120 in one or more embodiments. The identity authentication platform 120 uses a face of an individual 100 as a key for authenticating an identity of the individual 100 by linking the face of the individual 100 to an identity card 130 issued to the individual 100 by an authoritative entity.

The identity authentication platform 120 includes a registration module 126 that enables the individual 100 to register the identity card 130 with the identity authentication platform 120. The registration module 126 generates a reference face recognition template 152 for the individual 100 in response to the identity card 130 presented by the individual 100 during registration.

The authentication platform 120 includes a sampling module 122 that obtains a real-time photograph 140 of a face of the individual 100 in response to an assertion of an identity 102 made by the individual 100. The authentication platform 120 includes a verifier module 124 that authenticates the assertion 102 by generating a target face recognition template 154 in response to the real-time photograph 140 and matching the target face recognition template 154 to the reference face recognition template 152.

The assertion of an identity 102 can be made by the individual 100 in any context in which identity authentication is appropriate. For example, the individual 100 can make the assertion of an identity 102 when presenting a credit card as payment for a commercial transaction, e.g., an e-commerce transaction. The individual 100 can make the assertion of an identity 102 when creating bank accounts, email accounts, social networking accounts, etc., or when logging into those accounts. The individual 100 can make the assertion of an identity 102 when seeking access to a building or area within a building.

The identity card 130 can be one issued by a government authority to the individual depicted in a card photograph 132 of the identity card 130. For example, the identity card 130 can be a driver's license, passport, etc. issued to John Smith who is depicted in the card photograph 132. The identity card 130 can be one issued by a business or other institution, e.g., a school, nonprofit organization, etc. The identity card 130 can be embodied in a physical form, e.g. paper, plastic, other materials, etc. The identity card 130 can be in a digital form.

The identity card 130 can include a set of identifying information 134 for the individual depicted in the card photograph 132. The identifying information 134 can include a name, address, number, etc. For example, the identifying information 134 on a driver's license issued to John Smith by a government entity can include the name John Smith. The identifying information 134 can include a government issued number, e.g., a social security number, driver's license number, or a number issued by a business or institution, e.g., an employee number or student number, etc.

The individual 100 can make the assertion of an identity 102 by presenting the identifying information 134 in an identity identification context. For example, the individual 100 can make the assertion of an identity 102 by entering John Smith into a login page of a website, or by entering John Smith into an account creation page of a website. In another example, the individual 100 can make the assertion of an identity 102 by entering John Smith or an employee number of John Smith into a door locking mechanism of a physical structure. The individual 100 can make the assertion of identity 102 by any means, e.g., keyboard/keypad, speech recognition, card reader, camera, etc. The individual 100 can make the assertion of an identity 102 based on any aspect of the identifying information 134.

The identity card 130 can include physical features, e.g., a physical feature 136, that can be used to validate the authenticity of the identity card 130, i.e., that is a valid card issued by an authoritative entity. Examples of physical features include watermarks, stamps, holograms, patterns, etc.

The sampling module 122 can obtain the real-time photograph 140 using a camera 110. The camera 110 can be a camera of a computing device used by the individual 100 to make the assertion of an identity 102. The camera 110 can be a camera, e.g., webcam, in a mobile computing device, personal computer, laptop, wearable device, etc., The camera 110 can be a webcam affixed to a physical structure.

The verifier module 124 in one or more embodiments includes a template creation sub-module 150. The template creation sub-module 150 can generate the target face recognition template 154 in response to the real-time photograph 140. The target face recognition template 154 can include a variety of measurements of a set of facial features of the individual 100 depicted in the real-time photograph 140.

The registration module 126 can use the template creation sub-module 150 to generate the reference face recognition template 152 in response to a photograph of the individual 100 obtained during registration of the identity card 130 with the identity authentication platform 120. The registration module 126 can use the template creation sub-module 150 to generate the reference face recognition template 152 in response to the card photograph 132 obtained during registration of the identity card 130 with the identity authentication platform 120. The reference face recognition template 152 can include a variety of measurements of a set of facial features of the individual 100 depicted in the card photograph 132 or depicted in a photograph obtained of the individual 100 during registration.

The verifier module 124 in one or more embodiments includes a face verification sub-module 156. The face verification sub-module 156 determines whether the target face recognition template 154 matches the reference face recognition template 152. The face verification sub-module 156 can generate an error indicator that indicates an overall relative difference between the target face recognition template 154 and the reference face recognition template 152. For example, if the error indicator between the target face recognition template 154 and the reference face recognition template 152 is less than a predetermined threshold then it is a match and the assertion of an identity 102 is authentic.

Figure 2:
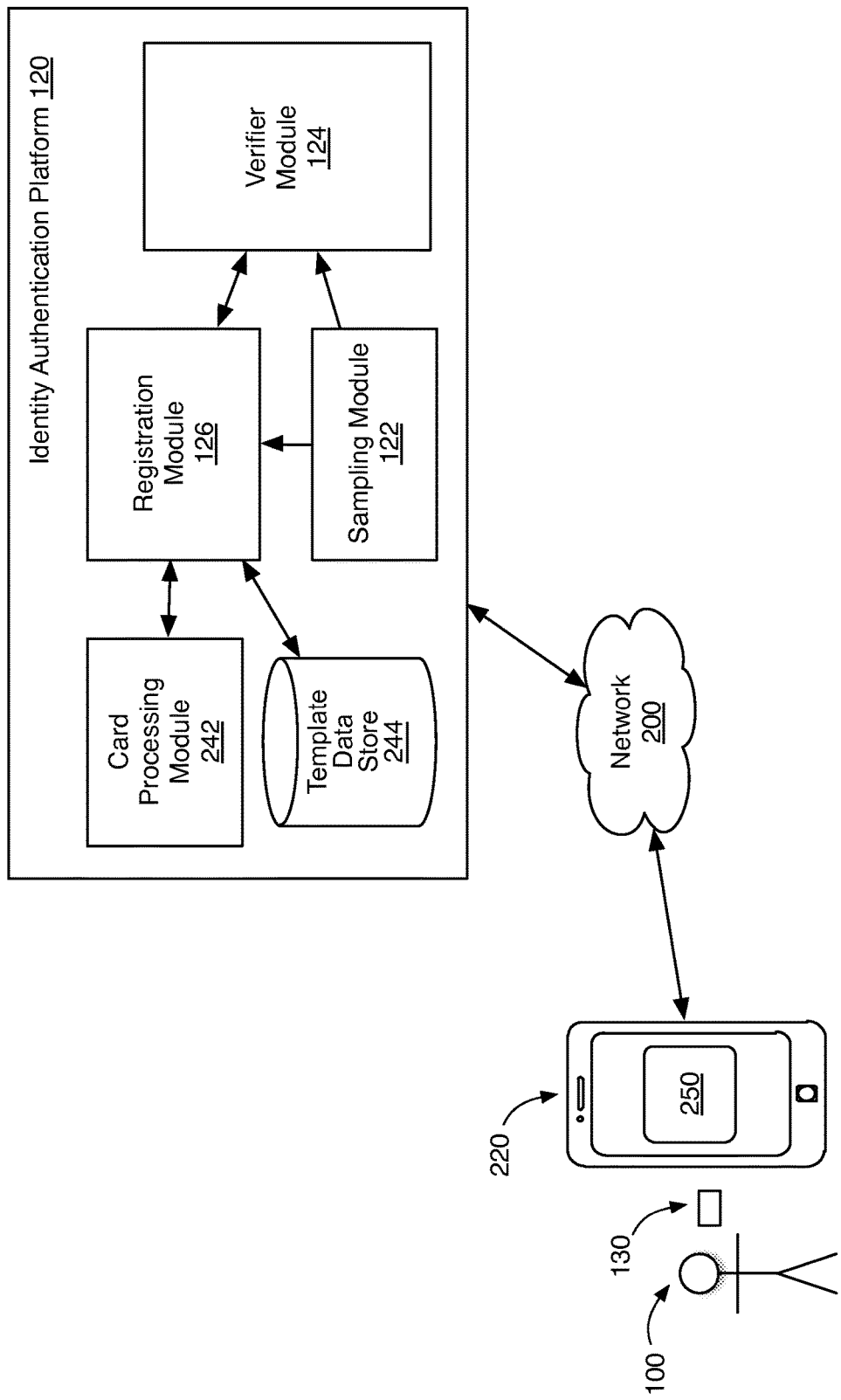
FIG. 2 illustrates an individual registering an identity card with an identity authentication platform in one or more embodiments.

FIG. 2 illustrates the individual 100 registering the identity card 130 with the identity authentication platform 120 in one or more embodiments. The individual 100 can register with the identity authentication platform 120 using a mobile app 250 on a mobile computing device 220. The mobile app 250 can be adapted for communicating with the identity authentication platform 120 via a network 200 using web protocols. The mobile app 250 can generate one or more registration screens on the mobile computing device 220 that enable the individual 100 to engage in a registration process on the identity authentication platform 120.

The registration process for the identity authentication platform 120 can include obtaining a scan, e.g., a photograph, of the identity card 130 using a camera in the mobile computing device 220. In one or more embodiments, the mobile app 250 can transmit the scan of the identity card 130 to the registration module 126 and a card processing module 242 in the identity authentication platform 120 can validate the identity card 130 using the physical feature 136 and extract the card photograph 132 and the identifying information 134 from the identity card 130.

The registration module 126 can use the verifier module 124 to verify that the individual 100 presenting the identity card 130 during registration is in fact the individual depicted in the card photograph 132 of the identity card 130. For example, the registration module 126 can use the sampling module 122 to obtain a real-time photograph of a face of the individual 100 presenting the identity card 130 during registration using a camera in the mobile computing device 220, and then use the verifier module 124 to verify that the individual 100 depicted in the real-time photograph obtained during registration matches the individual depicted in the card photograph 132 extracted from the identity card 130 presented during registration.

The registration module 126 can store the reference face recognition template 152, derived from the real-time photograph of the individual 100 presenting the identity card 130 during registration or from the card photograph 132, in a template data store 244. The template data store 244 can store reference face recognition templates for a number of users of the identity authentication platform 120.

In one or more embodiments, the individual 100 can use a personal computer having a webcam and running a web browser application to access the registration module 126 and scan the identity card 130 and verify their identity during registration. In one or more embodiments, the individual 100 can use a wearable device with a camera and running an app adapted for accessing the registration module 126 and scanning the identity card 130 and verifying their identity during registration.

In some embodiments, the registration module 126 can employ the services of a card processing website (not shown in FIG. 2) to validate the identity card 130 and extract the card photograph 132 and the identifying information 134. In some embodiments, the mobile app 250 can extract the card photograph 132 and the identifying information 134 from the scan of the identifying card 130 and transmit the card photograph 132 and the identifying information 134 to the registration module 126 via the network 200.

In some embodiments, the verifier module 124 can employ the services of a face recognition website (not shown in FIG. 2) to generate face recognition templates and perform face verification using the face recognition templates.

Figure 3:
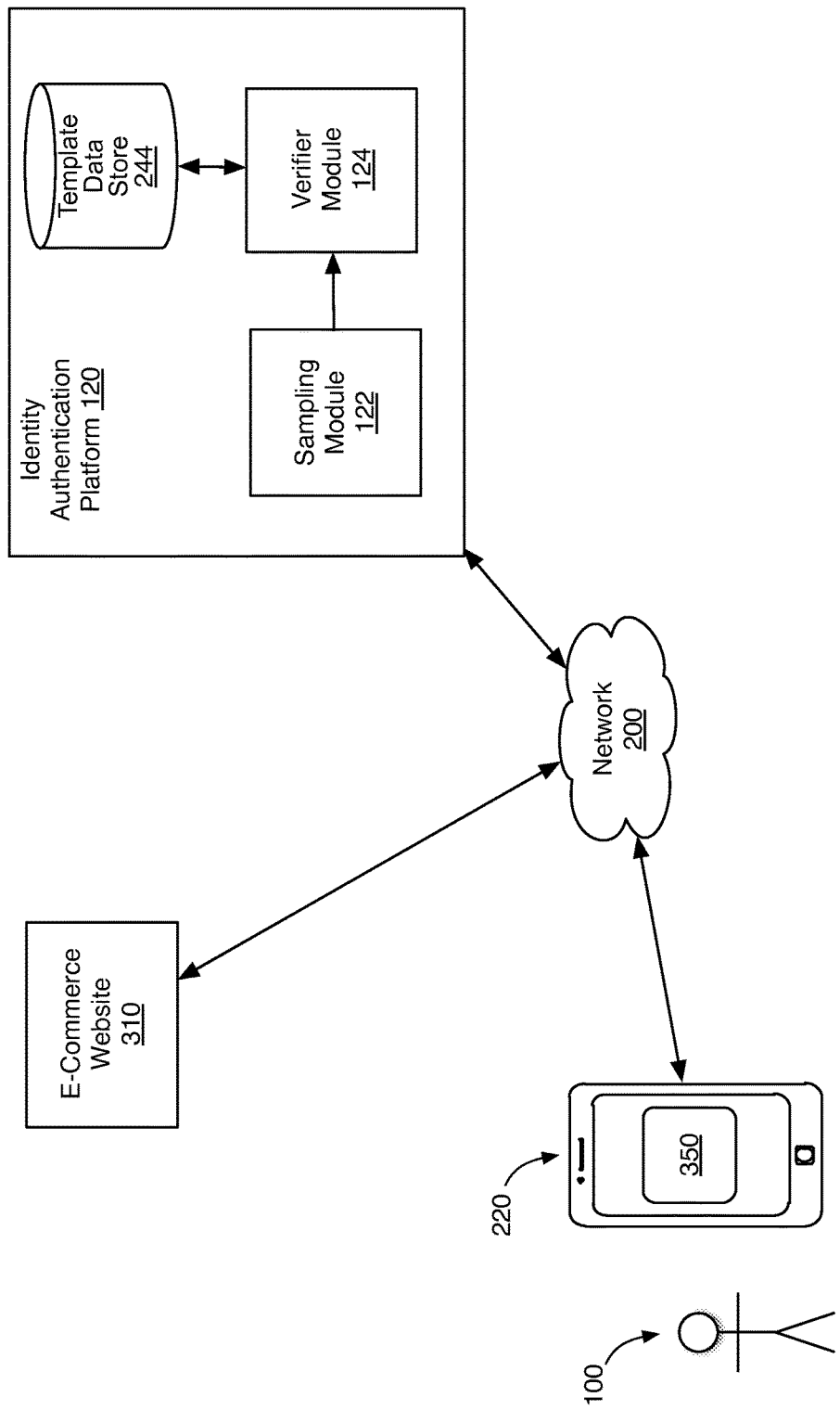
FIG. 3 illustrates an identity authentication platform authenticating an assertion of an identity made by an individual to an E-Commerce website in one or more embodiments.

FIG. 3 illustrates the identity authentication platform 120 authenticating an assertion of an identity made by the individual 100 to an E-Commerce website 310 in one or more embodiments. The individual 100 can make an assertion of an identity to the E-Commerce website 310 when creating an account on the E-Commerce website 310, when logging onto an account on the E-Commerce website 310, when accessing personal information on the E-Commerce website 310, when presenting credit card information to the E-Commerce website 310, or when making a purchase via the E-Commerce website 310, to name a few examples.

The individual 100 can run a mobile app 350 on their mobile computing device 220 that is adapted for browsing the E-Commerce website 310 and making purchases online. The mobile app 350 can communication with the E-Commerce website 310 via the network 200 using web protocols. The mobile app 350 can generate one or more screens that enable the individual 100 to create an account, log in, enter credit card information, select items for purchase, purchase selected items, access and edit personal information, etc.

The mobile app 350 can authenticate an assertion of an identity made by the individual 100 by acquiring a real-time photograph of a face of the individual 100 using a camera of the mobile computing device 220 and sending the real-time photograph to the sampling module 122. The verifier module 124 can authenticate the assertion of an identity made by the individual 100 via the mobile app 350 in response to the real-time photograph of the individual 100 sent from the mobile app 350.

For example, the individual 100 can assert that they are John Smith to the E-Commerce website 310 by entering the name John Smith via an account creation or login screen of the mobile app 350. The mobile app 350 in response can obtain a real-time photograph of the individual 100 and send it to the sampling module 122 in identity authentication platform 120 as an authentication key along with the name John Smith as identifying information. The verifier module 124 can then generate a target face recognition template in response to the real-time photograph of the individual 100 from the mobile app 350 and compare it to the reference face recognition template for John Smith stored in the template data store 244.

In other embodiments, the individual 100 can access the E-Commerce website 310 using a personal computer running a web browser. The E-Commerce website 310 can generate one or more web pages that enable the individual 100 to create an account, log in, browse items and select items for purchase, purchase selected items, etc. The web browser running on the personal computer can acquire a real-time photograph of the individual 100 using a webcam of the personal computer and send it to the sampling module 122.

In still other embodiments, the individual 100 can access the E-Commerce website 310 and browse and make purchases and make and authenticate an assertion of an identity using a wearable device.

Figure 4:
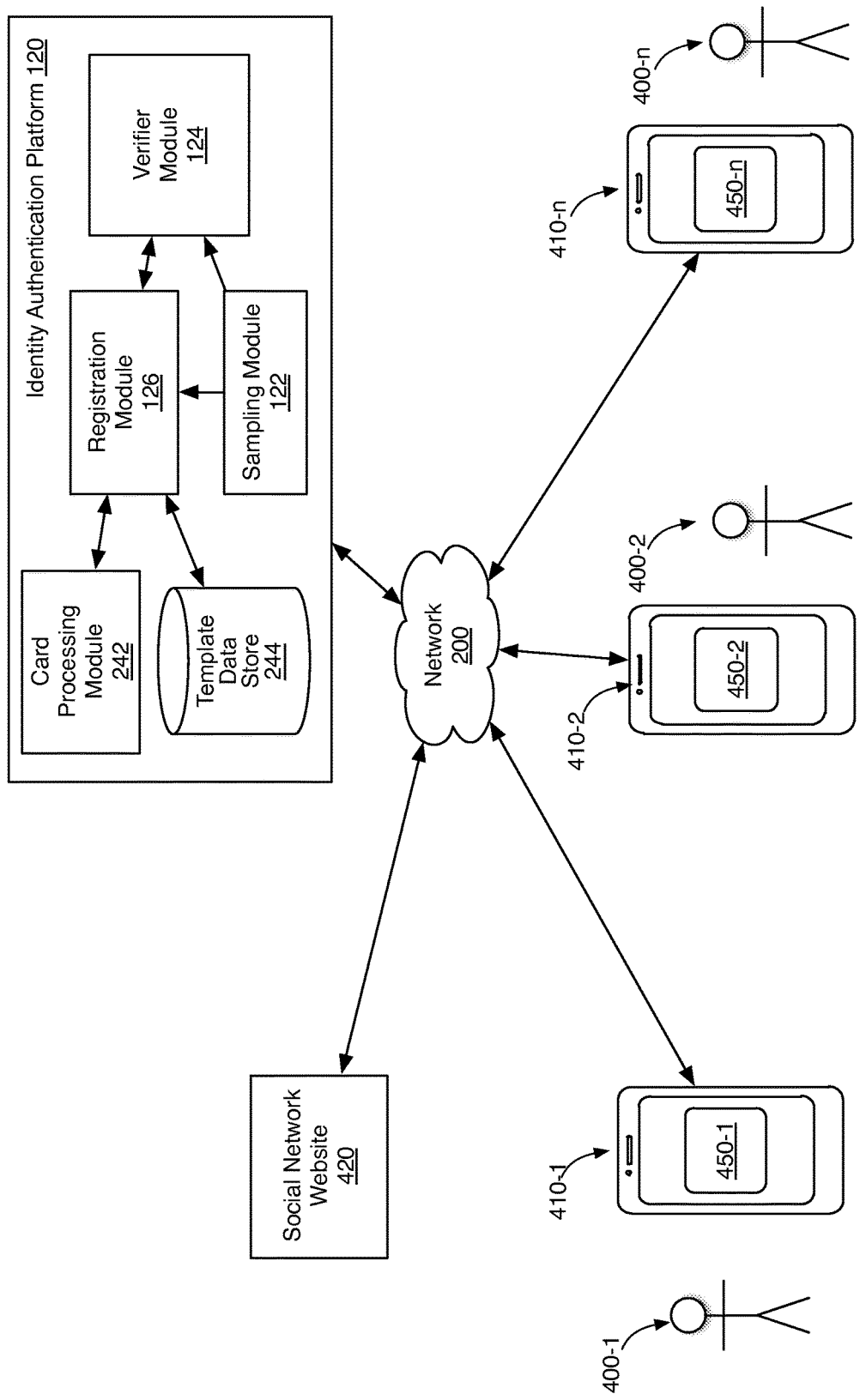
FIG. 4 illustrates an identity authentication platform authenticating assertions of identities made by users of a social network website.

FIG. 4 illustrates the identity authentication platform 120 authenticating assertions of identities made by users of a social network website 420. The social network website 420 can be any service that provides social interactions among users of the social network website 420. The social network website 420 can provide an email service, a push messaging service, a social web page service, a direct messaging service among users, etc., or any combination of these types of services.

In this example, a set of individuals 400-1 through 400-*n* can create respective accounts on the social network website 420 using their respective mobile computing devices 410-1 through 410-*n*. The mobile computing devices 410-1 through 410-*n* can be any combination of smartphones, tablets, wearable devices, etc. The individuals 400-1 through 400-*n* can access the social network website 420 by downloading a mobile app 450 adapted to the social network website 420 and running it (450-1 through 450-*n*) on their respective mobile computing devices 410-1 through 410-*n*.

The mobile apps 450-1 through 450-*n* can enable the individuals 400-1 through 400-*n* to create accounts on the social network website 420 and log on to those accounts. The mobile apps 450-1 through 450-*n* can work in concert with the identity authentication platform 120 to authenticate assertions of identities made by the individuals 400-1 through 400-*n* when accessing the social network website 420. For example, the individuals 400-1 through 400-*n* can register their respective identity cards with the identity authentication platform 120 via the registration module 126 and the registration module 126 can store reference face recognition templates for the individuals 400-1 through 400-*n* in the template data store 244. The mobile apps 450-1 through 450-*n* can acquire real-time photographs of the individuals 400-1 through 400-*n* and the identity authentication platform 120 can authenticate the respective assertions of identity made by the individuals 400-1 through 400-*n* by using the respective real-time photographs of the individuals 400-1 through 400-*n* as authentication keys.

Any of individuals 400-1 through 400-*n* can use a personal computer with a webcam and web browser to access the social network website 420 and authenticate their assertion of an identity via the identity authentication platform 120.

Figure 5:
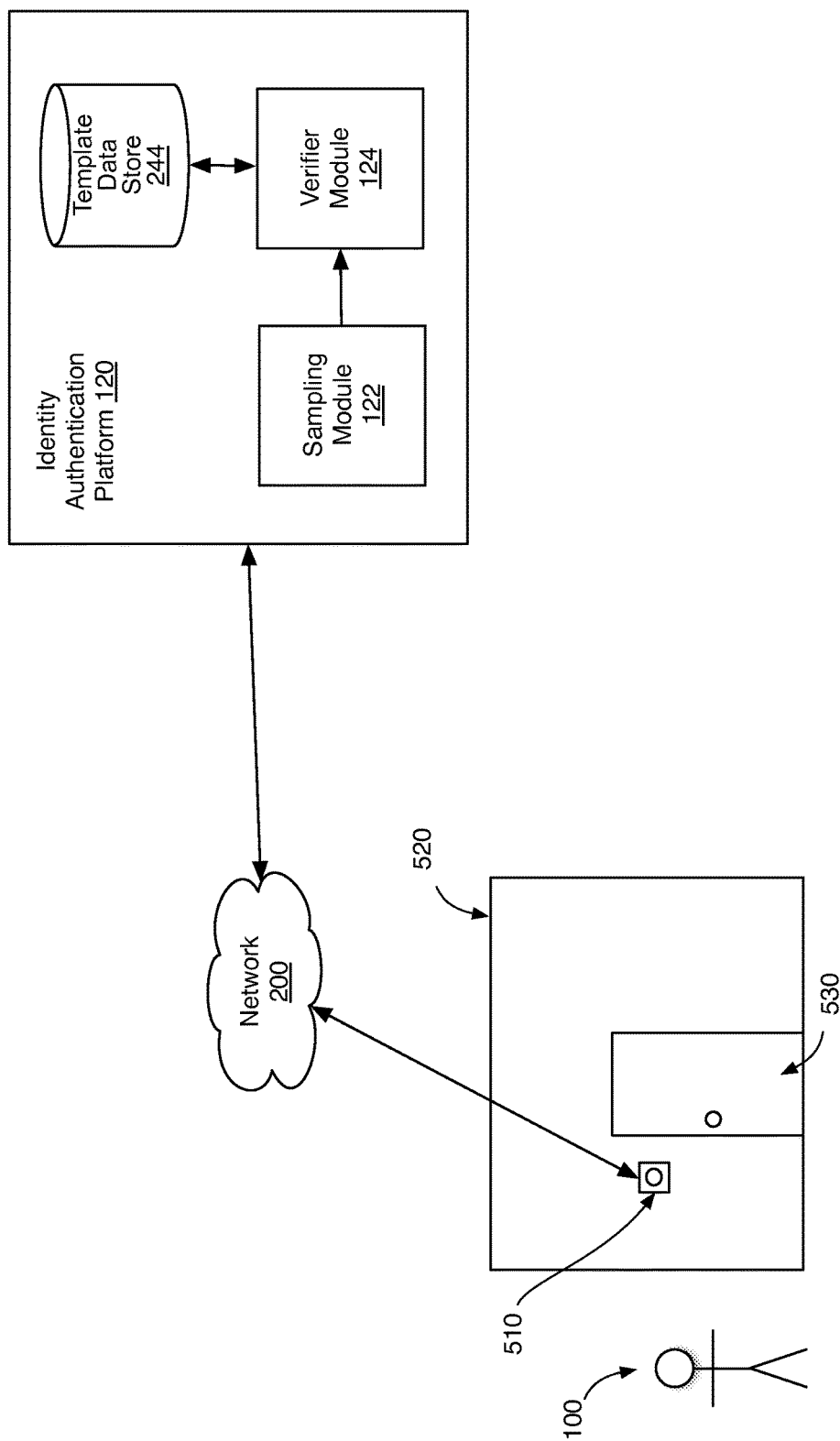
FIG. 5 illustrates an identity authentication platform authenticating an assertion of an identity made by an individual who seeks entry into a structure.

FIG. 5 illustrates the identity authentication platform 120 authenticating an assertion of an identity made by the individual 100 who seeks entry into a physical structure 520 via a doorway 530. The individual 100 can make the assertion of an identity by entering a name or other identifying information into a keypad, card reader, card scanner, etc., at the doorway 530.

A webcam 510 affixed to the structure 520 acquires a real-time photograph of a face of the individual 100 and transmits it to the identity authentication platform 120 via the network 200 along with identifying information provided by the individual with the assertion of an identity. The identity authentication platform 120 authenticates the assertion of an identity using the real-time photograph obtained via the webcam 510 as an authentication key.

Figure 6:
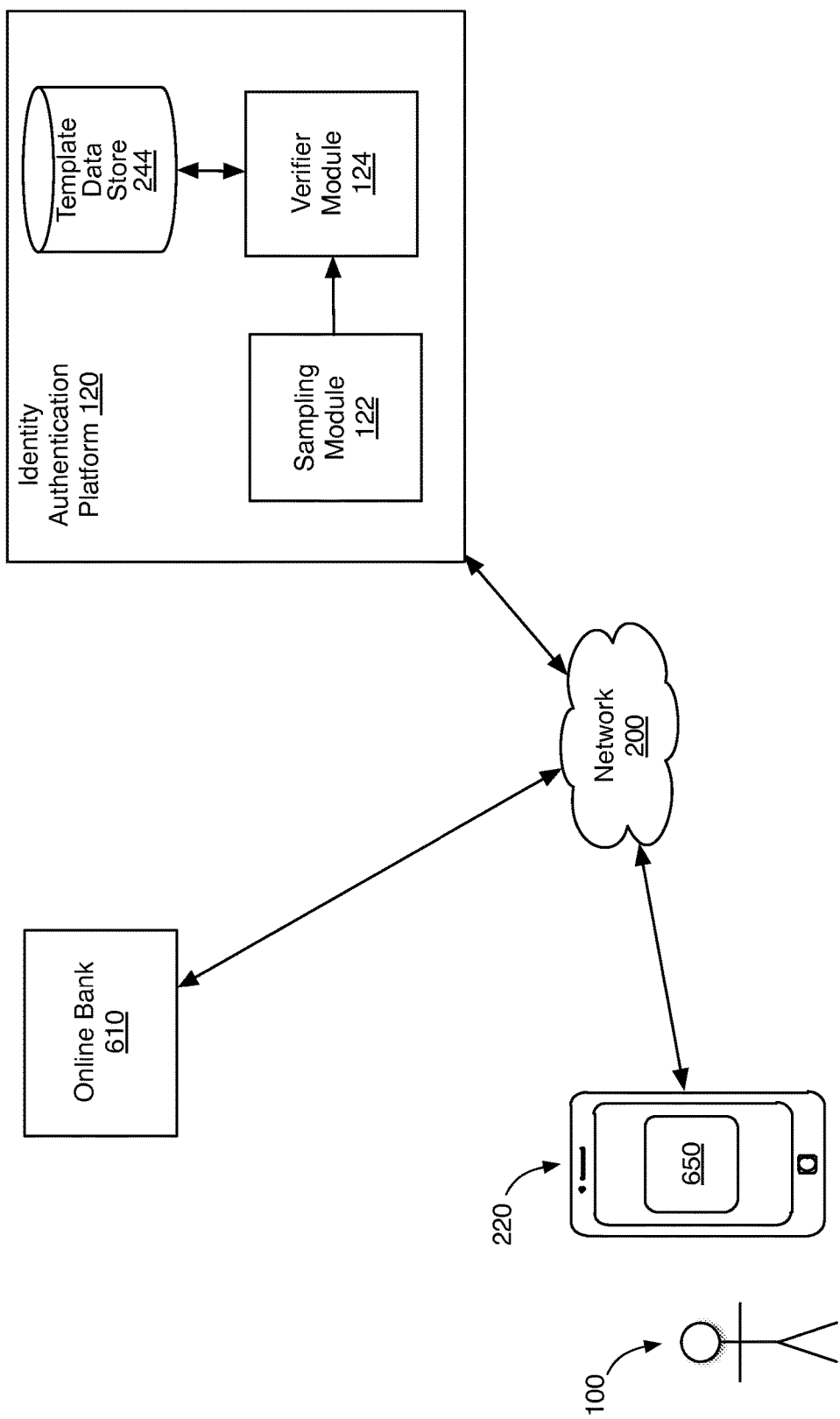
FIG. 6 illustrates an identity authentication platform authenticating an assertion of an identity made by an individual to an online bank.

FIG. 6 illustrates the identity authentication platform 120 authenticating an assertion of an identity made by the individual 100 to an online bank 610 in one or more embodiments. The individual 100 can make the assertion of an identity when creating an account with the online bank 610, when logging in to the online bank 610, when accessing funds deposited with the online bank 610, when entering or modifying personal information for their account with the online bank 610, to name a few examples.

In one or more embodiments, the individual 100 can access the online bank 610 via the network 200 using a mobile app 650 running their mobile device 220. The mobile app 650 can be adapted for creating accounts on the online bank 610, logging into existing accounts, and performing banking function on the online bank 610. The mobile app 650 can obtain a real-time photograph of a face if the individual 100 in response to the individual 100 making an assertion of an identity. The mobile app 650 can provide the real-time photograph of the individual 100 to the identity authentication platform 120 via the network 200 to be used as an authentication key for the assertion of an identity. In some embodiments, the individual 100 can make the assertion of an identity via a personal computer running a web browser or a wearable device running a mobile app. A webcam of the personal computer or wearable device can be used to acquire the real-time photograph of the individual 100.

Figure 7:
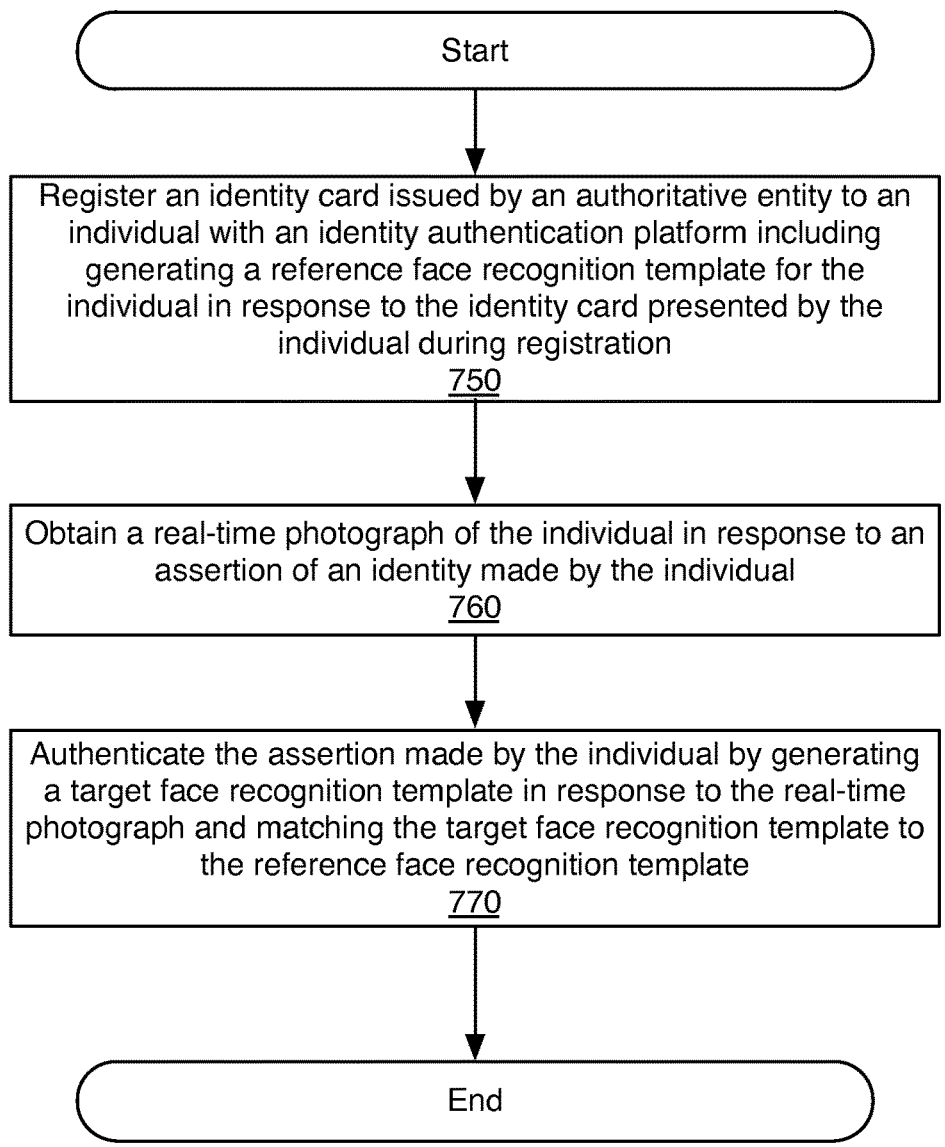
FIG. 7 illustrates a method for identity authentication in one or more embodiments.

FIG. 7 illustrates a method for identity authentication in one or more embodiments. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 7 should not be construed as limiting the scope of the invention.

At step 750, an identity card issued by an authoritative entity to an individual is registered with an identity authentication platform. The authoritative entity can be a government office, a business, or other institution, etc. Registering the identity card includes generating a reference face recognition template for the individual in response to the identity card presented by the individual during registration.

At step 760, a real-time photograph of the individual is obtained in response to an assertion of an identity made by the individual. The real-time photograph can be obtained in real-time by a computing device, e.g. personal computer, smartphone, tablet, wearable device, etc., of the individual using a camera, e.g., a webcam, in the computing device. The assertion of an identity can be made by the individual during an e-commerce transaction, when creating or logging into an account with a web service, e.g., email, social network, etc., or when seeking access to a physical structure, to name a few examples.

At step 770, the assertion made by the individual is authenticated by generating a target face recognition template in response to the real-time photograph and matching the target face recognition template to the reference face recognition template.

Embodiments of the invention may be implemented on a specialized computer system. Examples of such a computing system can include one or more mobile computing devices (e.g., laptop computer, smart phone, personal digital assistant, tablet computer, or other mobile computing device, game console), desktop computers, servers, blades in a server chassis, or any other type of computing device(s) that include at least the minimum processing power, memory, and input and output device(s) to perform one or more embodiments of the invention.

Figure 8:
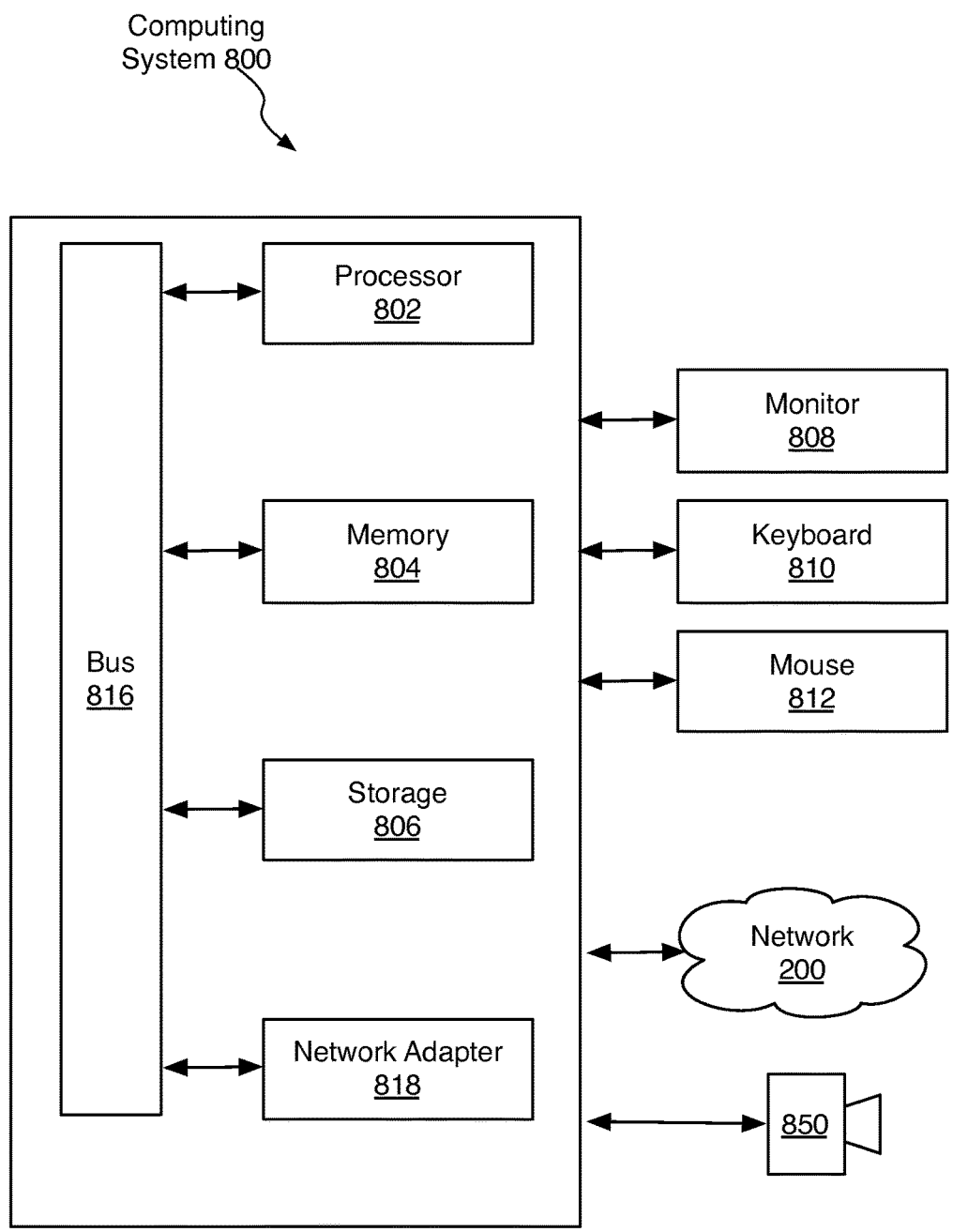
FIG. 8 illustrates a computing system upon which portions of an identity authentication platform can be implemented.

FIG. 8 illustrates a computing system 800 upon which portions of the can be implemented. For example, the sampling module 122 and the verifier module 124 and registration module 126 as well as other elements of the identity authentication platform 120 can be implemented on the computing system 800. The computing system 800 includes one or more computer processor(s) 802, associated memory 804 (e.g., random access memory (RAM), cache memory, flash memory, etc.), one or more storage device(s) 806 (e.g., a hard disk, an optical drive such as a compact disk (CD) drive or digital versatile disk (DVD) drive, a flash memory stick, etc.), a bus 816, and numerous other elements and functionalities. The computer processor(s) 802 may be an integrated circuit for processing instructions. For example, the computer processor(s) may be one or more cores or micro-cores of a processor. The computing system 800 may also include one or more input device(s), e.g., a touchscreen, keyboard 810, mouse 812, microphone, touchpad, electronic pen, or any other type of input device. Further, the computing system 800 may include one or more monitor device(s) 808, such as a screen (e.g., a liquid crystal display (LCD), a plasma display, touchscreen, cathode ray tube (CRT) monitor, projector, or other display device), external storage, input for an electric instrument, or any other output device. The computing system 800 may be connected to the network 200 (e.g., a local area network (LAN), a wide area network (WAN) such as the Internet, mobile network, or any other type of network) via a network adapter 818. The computing system 800 can include a camera 850, e.g., a webcam.

While the foregoing disclosure sets forth various embodiments using specific diagrams, flowcharts, and examples, each diagram component, flowchart step, operation, and/or component described and/or illustrated herein may be implemented, individually and/or collectively, using a range of processes and components.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While the invention has been described with respect to a limited number of embodiments, those skilled in the art, having benefit of this disclosure, will appreciate that other embodiments may be devised which do not depart from the scope of the invention as disclosed herein.

What is claimed is:

1. A method for authenticating an individual accessing a web service, comprising:

obtaining a real-time photograph of the individual using a camera subsystem of a device used by the individual to make an assertion of an identity to the web service; and authenticating the identity by comparing the real-time photograph to a face recognition template previously derived from an identity card issued by an authoritative entity to the individual and previously stored in a data store of an identity authentication platform when the individual registered the identity card on the identity authentication platform by presenting the identity card to the identity authentication platform;

wherein the face recognition template is previously derived and stored in the data store by registering the identity of the individual on the identity authentication platform by obtaining a photograph of the identity card and generating the face recognition template and a set of identifying information for authenticating the identity of the individual in response to the photograph of the identity card and storing the face recognition template in the data store of the identity authentication platform.

2. The method of claim 1, wherein the individual makes the assertion based on the identifying information obtained from the photograph of the identity card.

3. The method of claim 1, wherein registering includes obtaining a photograph of the individual and determining whether a face depicted in the photograph of the individual matches a face depicted in the photograph of the identity card.

4. The method of claim 1, wherein registering includes validating the identity card based on a physical feature imparted into the identity card.

5. A device that enables an individual to access a web service, comprising:
   a computer processor;
   a camera; and
   an app executing on the computer processor and adapted for accessing the web service, the app obtaining a real-time photograph of the individual using the camera when the individual makes an assertion of an identity to the web service such that the identity is authenticated by comparing the real-time photograph to a face recognition template previously derived from an identity card issued by an authoritative entity to the individual and previously stored in a data store of an identity authentication platform when the individual registered their identity by presenting the identity card to the identity authentication platform, the app registering the identity of the individual on the identity authentication platform by obtaining a photograph of the identity card using the camera and deriving the face recognition template and a set of identifying information for authenticating the identity of the individual from the photograph of the identity card.

6. The device of claim 5, wherein the app registers the identity of the individual by obtaining a photograph of the individual using the camera and determining whether a face depicted in the photograph of the individual matches a face depicted in the photograph of the identity card.

7. The device of claim 5, wherein the app registers the identity of the individual by validating the identity card based on a physical feature imparted into the identity card.

8. The device of claim 5, wherein the individual makes the assertion based on the identifying information obtained from the photograph of the identity card.

9. An identity authentication platform stored on a computer memory, comprising:
   a data store that holds a face recognition template derived from an identity card issued by an authoritative entity to an individual and presented by the individual to the identity authentication platform when the individual registers their identity on the identity authentication platform;
   a sampling module that obtains a real-time photograph of the individual when the individual makes an assertion of an identity after the individual registers their identity on the platform;
   a verifier module that verifies the assertion of the identity by comparing the real-time photograph to the face recognition template stored in the data store; and
   a registration module that enables the individual to register their identity with the identity authentication platform by obtaining a photograph of the identity card and generating a face recognition template and a set of identifying information for authenticating the identity of the individual in response to the photograph of the identity card and storing the face recognition template in the data store.

10. The identity authentication platform of claim 9, wherein registration module obtains a photograph of the individual and determines whether a face depicted in the photograph of the individual matches a face depicted in the photograph of the identity card.

11. The identity authentication platform of claim 9, wherein the registration module validates the identity card based on a physical feature imparted into the identity card.

12. The identity authentication platform of claim 9, wherein the individual makes the assertion based on the identifying information obtained from the photograph of the identity card.

13. The identity authentication platform of claim 9, wherein the sampling module obtains the real-time photograph of the individual using a camera of a device used to access a web service.

14. The identity authentication platform of claim 9, wherein the sampling module obtains the real-time photograph of the individual using a camera affixed to a physical structure.

* * * * *